United States Patent [19]

Kiyotaki

[11] Patent Number: 5,731,865
[45] Date of Patent: Mar. 24, 1998

[54] PHOTOMETRIC SYSTEM FOR A PHOTOGRAPHIC PRINTING APPARATUS

[75] Inventor: Yoshihiro Kiyotaki, Wakayama, Japan

[73] Assignee: Noritsu Koki Co., Ltd., Wakayama, Japan

[21] Appl. No.: 690,583

[22] Filed: Jul. 31, 1996

[30] Foreign Application Priority Data

Aug. 2, 1995 [JP] Japan .................. 7-197196

[51] Int. Cl.$^6$ .............. G03B 27/72; G01J 1/00; G01J 1/42
[52] U.S. Cl. .............. 355/35; 355/38; 355/41; 355/68; 356/213; 356/218
[58] Field of Search ............... 356/218, 405, 356/407; 355/38, 41, 68, 35

[56] References Cited

U.S. PATENT DOCUMENTS

| | | | |
|---|---|---|---|
| 4,585,348 | 4/1986 | Chastang et al. | 356/369 |
| 4,666,306 | 5/1987 | Matsumoto | 355/38 |
| 5,006,886 | 4/1991 | Suzuki | 355/35 |
| 5,019,858 | 5/1991 | Suzuki | 355/55 |
| 5,041,868 | 8/1991 | Suzuki | 355/68 |
| 5,053,807 | 10/1991 | Uryu | 355/38 |
| 5,101,227 | 3/1992 | Ikenoue et al. | 355/68 |

FOREIGN PATENT DOCUMENTS

| | | |
|---|---|---|
| 0514909 | 5/1992 | European Pat. Off. . |
| 57-207237 | 12/1982 | Japan . |
| 353549 | 4/1961 | Switzerland . |
| 369967 | 6/1963 | Switzerland . |

OTHER PUBLICATIONS

Konishiroku Shashin Kogyo, JP-A-57 207237, Patent Abstracts of Japan, vol. 7, No. 60 (p-182), 12 Mar. 1983.

Primary Examiner—R. L. Moses
Assistant Examiner—Shival Virmani
Attorney, Agent, or Firm—Felfe & Lynch

[57] ABSTRACT

A photometric system for a photographic printing apparatus having an exposure device for projecting light traveling from a light source (21) through a mirror tunnel (24), along a projection path through a photographic film (2) to printing paper (3). An opening (24b) is formed in a side wall (24d) having a mirror surface for forming the mirror tunnel. The photometric system includes a photometer (60) disposed outside the mirror tunnel for metering only light entering through the opening (24b) from a region of the opening (24b) and a region displaced from the region of the opening (24b) toward the light source, and a reflection mirror (31; 71) for deflecting the light entering through the opening (24b) toward the photometer (60). The reflection mirror (71) is switchable between a first position for deflecting the light entering through the opening (24b) toward the photometer (60), and a second position for covering the opening (24b).

9 Claims, 5 Drawing Sheets

PHOTOMETRIC SYSTEM FOR A PHOTOGRAPHIC PRINTING APPARATUS

BACKGROUND OF THE INVENTION

1. Field of the Invention

This invention relates to a photometric system for metering light traveling from a light source to a projection surface through a mirror tunnel, and particularly to a photometric system for use in a photographic printing apparatus. The mirror tunnel is formed of side walls having mirror surfaces.

2. Description of the Related Art

A photographic printing apparatus has an exposing device in which light emerging from a light source travels along a projection path and through a mirror tunnel, and passes through a photographic film to a photosensitive material. In an intermediate position of an optical path from the light source to the photographic film, the color balance of the light is adjusted by an adjustment filter to attain desired printing conditions. Further, inside the mirror tunnel, the spatial intensity distribution of the light is uniformed. In order to print images of the photographic film properly on the photosensitive material, it is necessary to confirm, with a photometric system for metering the light from the light source, that the light adjusted as above for irradiating the photographic film has a desired color balance.

In the prior art shown in FIG. 6, light exiting a light source 100 and passing through an adjustment filter 101 and a mirror tunnel 102 is metered by a light receiving element 104 disposed adjacent a printing lens 103 which forms images of a photographic film 2 on a photosensitive material. For the photometric purposes, a light source controlling dimmer filter 105 is often disposed between the adjustment filter 101 and mirror tunnel 102 in order to provide a state analogous to where a standard photographic film is on a light projection path. The light receiving element 104 outputs a detection signal for use in maintaining the quantity of light irradiating the photographic film 2 at a proper level. In the prior art, however, the light receiving element 104 disposed adjacent the printing lens 103 with respect to the photographic film 2 detects also ambient light besides the light for irradiating the photographic film 2. Ambient light affects and lowers photometric precision. To preclude the influence of ambient light, a cover must be provided to enclose the portion of the apparatus downstream of the photographic film 2 with respect to the direction of light projection. This results in a complicated construction of the photographic printing apparatus.

To avoid the above inconvenience, Japanese Patent Publication Kokai No. S57-207237 proposes a technique of providing a prism for taking out part of light traveling through a light projection path. The prism is disposed in an intermediate position of a mirror tunnel, with a forward end thereof projecting into the mirror tunnel. An optical fiber guides the light taken out by the prism. Since part of the light is taken out of the mirror tunnel, this construction is not affected by ambient light as is the prior an noted hereinbefore. However, the prism for taking out part of the light is obstructive to the light propagating through the mirror tunnel. This hampers the function of the mirror tunnel to uniform the spatial intensity distribution of the light.

Further, Japanese Utility Model Publication Kokai No. S3-122439 proposes a technique in which a light guide pin is mounted in an opening defined in a side wall of a mirror tunnel, and a light receiving element detects light guided by the guide pin. In this construction, the light guide pin does not project into the minor tunnel, so that the guide pin does not obstruct passage of the light through the mirror tunnel. However, the light guide pin may receive ambient light entering through the outlet of the mirror tunnel, and irradiating light emitted from a light source and reflected by a photographic film. Such light may be detected by the light receiving element as disturbance.

SUMMARY OF THE INVENTION

This invention has been made having regard to the state of the art noted above, and its object is to provide a photometric system for metering, with high precision, light traveling from a light source through a mirror tunnel to irradiate a photographic film directly, without detecting unwanted light acting as disturbance.

The above object is fulfilled, according to this invention, by disposing a photometer outside a mirror tunnel for metering only light entering through a region of an opening formed in a side wall of the mirror tunnel and a region displaced from the region of the opening toward a light source. According to this construction, part of the light exiting the light source and entering the mirror tunnel passes through the opening formed in the side wall of the mirror tunnel to reach the photometer. However, the photometer is so arranged that light entering the mirror tunnel through an outlet end thereof cannot reach the photometer. Thus, the photometer is protected from light acting as a disturbance, to meter with high precision the light traveling from the light source through the mirror tunnel and directly irradiating a photographic film. The position of the photometer for avoiding disturbing light may be determined geometrically, taking the rectilinear propagation of light into account.

In a preferred embodiment of this invention, the photometer is supported by the mirror tunnel. In this case, the photometer is positioned relative to the mirror tunnel by assembling the photometer to the mirror tunnel. This dispenses with maintenance operations such as adjusting the position of the photometer.

In another embodiment, the photometric system further comprises a deflecting device for deflecting the fight entering through the opening toward the photometer. This provides increased freedom in arranging the photometer, thereby to facilitate overall designing.

The deflecting device may comprise a prism or a reflection mirror. In particular, a reflection mirror is preferred since incidence light may be deflected 180 degrees, which allows the photometer to be disposed closer to the light source than where the photometer is disposed in a position for directly detecting light having passed through the opening noted above. It is usually difficult to secures sufficient space between the mirror tunnel and a position of the photographic film since the region extending from the exposure light source to the position of the film is enclosed in a cover. Since the photometer may be disposed toward the light source as noted above, a vacant space may be used to advantage.

The reflection mirror may be made switchable between a first position for deflecting the light entering through the opening toward the photometer, and a second position for covering the opening. In this case, part of the light passing through the mirror tunnel is taken out only when the photometer is required to meter the light. Thus, the opening has a minimal influence on the irradiating light during exposure.

In a further preferred embodiment of the invention, the photometer includes a first detecting device for detecting red light, a second detecting device for detecting green light, and a third detecting device for detecting blue light. The third detecting device is disposed in a location for receiving light of maximum intensity entering the photometer, the first detecting device and the second detecting device being arranged around and in substantially the same plane as the third detecting device. Of the three detecting devices of the photometer for detecting red, green and blue lights, the third detecting device for detecting blue light is disposed in a location for receiving light of the greatest intensity.

For example, an exposure light source such as a halogen lamp, generally, gives weak blue components. If the different color components were detected as they are, a detection signal of blue light would be weaker than signals of other colors, making it difficult to make a fair comparison of strengths of the detection signals. The above arrangement of the detecting devices increases the strength of the blue light detection signal relative to the other signals. Consequently, substantially uniformed detection signals are obtained from the red, green and blue lights detected the detecting devices, to facilitate subsequent processing of the detection signals. Further, a light diffuser plate may be provided for diffusing the light entering through the opening, before reaching the photometer, i.e. the detecting devices. The light entering through the opening has its intensity distribution further uniformed by the diffuser plate before reaching the photometer. The light to be metered by the photometer may not always be sufficiently uniform since the light is taken out of an intermediate position of the mirror tunnel. The diffuser plate further uniforms the light to improve the precision of photometry.

In an embodiment of the invention in which the photometric system is incorporated into a photographic printing apparatus having an exposure device for projecting light traveling from a light source through a mirror tunnel, along a projection path through a photographic film to a photosensitive material, a light source control filter is disposed between the light source and the mirror tunnel for adjusting light passing through the mirror tunnel, to light corresponding to light having passed through the photographic film. The light source control filter is switchable between an operative position on the projection path, and an inoperative position retracted from the projection path. The reflection mirror is switched to the first position when the light source control filter is in the operative position, and to the second position when the light source control filter is in the inoperative position. In this construction, when the photometer meters light for controlling the light source, the light source control filter is positioned on the projection path, and the reflection mirror reflects light having passed through the opening formed in the side wall of the mirror tunnel. During a normal printing operation, the light source control filter is retracted from the projection path, and the reflection mirror closes the opening. At this time, the reflecting surface of the reflection mirror faces inwardly of the mirror tunnel to act as part of the inner mirror surfaces of the mirror tunnel. This minimizes loss of the light passing through the mirror tunnel.

Other features and advantages of this invention will be apparent from the following description of a preferred embodiment of the invention as illustrated in the accompanying drawings.

DESCRIPTION OF THE PREFERRED EMBODIMENTS

A photographic printing apparatus 1 employing a photometric system according to this invention will be described hereinafter with reference to the drawings.

Figure 1:
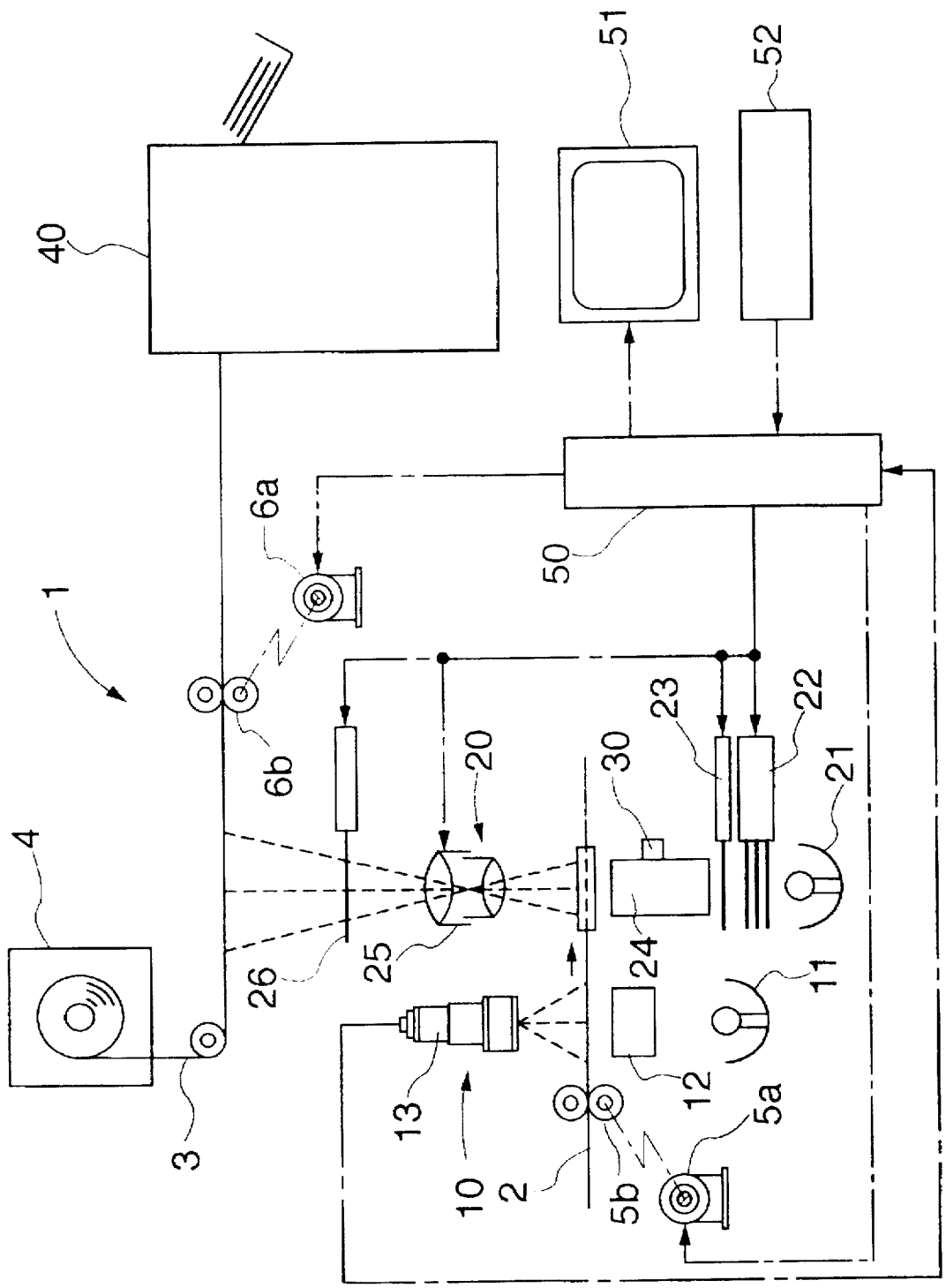
FIG. 1 is a view showing an outline of a photographic printing apparatus employing a photometric system according to this invention.

As shown in FIG. 1, the photographic printing apparatus 1 includes an image information reader 10 for reading image information from a photographic film 2, a projecting and exposing device 20 for projecting and exposing images of the film 2 onto printing paper 3, a developing device 40 for developing exposed printing paper 3, and a controller 50 for controlling operation of the entire photographic printing apparatus 1 and computing exposure conditions.

Each component will be described hereinafter.

The image information reader 10 includes a light source 11 for reading image information, a mirror tunnel 12 for uniforming an intensity distribution of light emitted from the light source 11, and a CCD unit 13 for picking up the images of the film 2 as separated into the three primaries of red, green and blue.

The image information of the film 2 picked up by the CCD unit 13 is transmitted to the controller 50 for use in computing exposure conditions, for example.

The projecting and exposing device 20 includes an exposing light source 21, a light adjustment filter 22 for adjusting light emitted from the light source 21 to a desired color balance, a light source control filter 23 having a density corresponding to that of standard film 2, a mirror tunnel 24, a printing lens 25 for forming the images of the film 2 on the printing paper 3, and a shutter 26.

In the projecting and exposing device 20, the adjustment filter 22 and shutter 26 are properly controlled by the controller 50 based on exposure conditions determined from the image information of the film 2 provided by the CCD unit 13. Then the images of the film 2 am printed on the printing paper 3 drawn from a printing paper magazine 4.

The film 2 is transported from the image information reader 10 to the projecting and exposing device 20 by rollers 5b driven by a motor 5a. The printing paper 3 is intermittently transported to the developing device 40 by rollers 6b driven by a motor 6a as each image is printed by the projecting and exposing device 20. Though not shown, the developing device 40 includes a plurality of developing tag each storing a different type of developing solution. The printing paper 3 successively passes through these developing tanks to be developed. The printing paper 3 is then dried and cut to respective images.

An outline of operation of the above photographic printing apparatus 1 controlled by the controller 50 will be described next.

The film 2 fed to the image information reader 10 is transported by the rollers 5b, whereby image information in each frame of the film 2 is read successively.

A monitor 51 and a control panel 52 are connected to the controller 50. The monitor 51 displays simulated images computed by the controller 50 from the image information of the film 2 read by the image information reader 10. That is, the monitor 51 displays images simulating the images of the film 2 to be printed on the printing paper 3.

The operator may observe the images displayed on the monitor 51, and input revised exposure conditions through the control panel 52 as necessary. In this way, the operator inputs instructions to finalize the exposure conditions. Based on the finalized exposure conditions, controls are effected as to a position to which the adjustment filter 22 is inserted and timing of operating the shutter 26, to project the images of the film 2 to the printing paper 3. Exposed printing paper 3 is developed by the developing device 40 as noted above.

The photometric system using the light source control filter 23 will be described next.

The photometric system executes light source control action periodically. Specifically, the photometric system meters light passing through the light source control filter 23 positioned on the light projecting path (i.e. placed in operative state). The light source control filter 23 is positioned on the light projecting path only in time of metering light. During normal exposure, the light source control filter 23 is retracted from the light projecting path (i.e. inoperative state).

Figure 2:
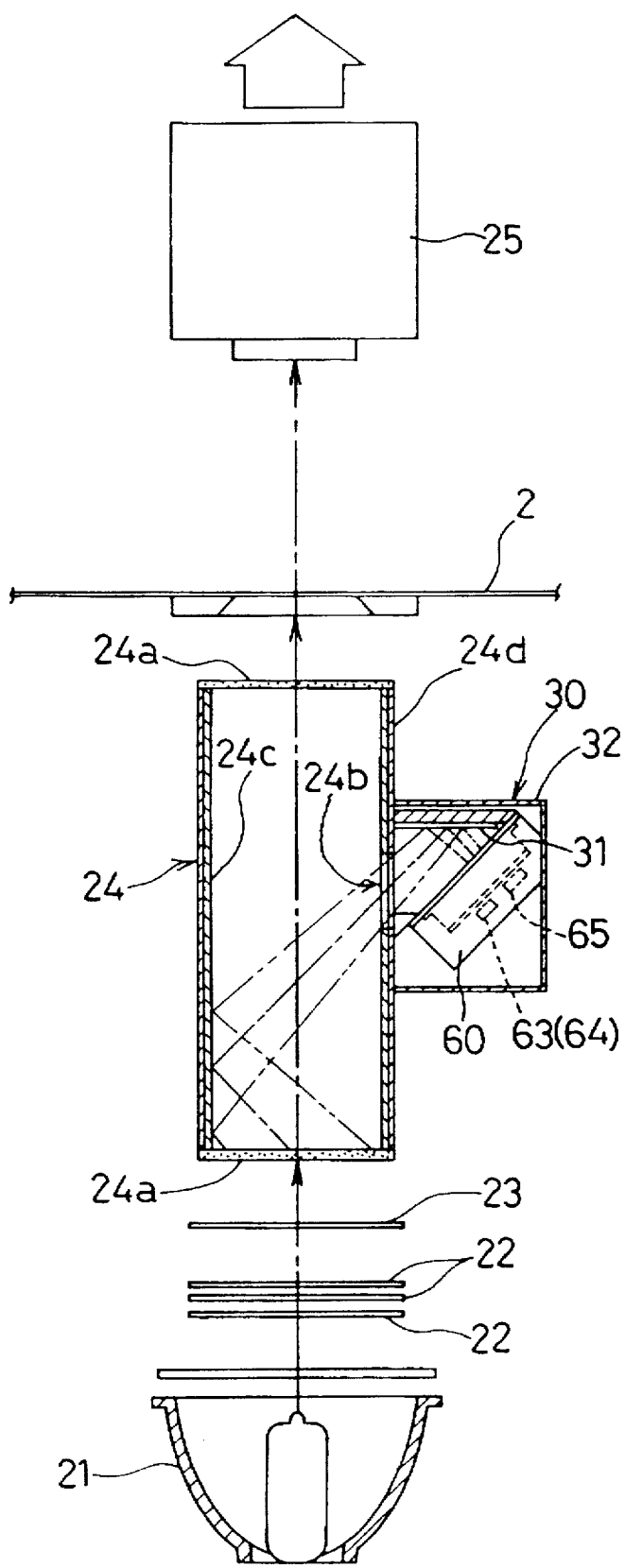
FIG. 2 is a schematic view of the photometric system according to this invention.
Figure 3:
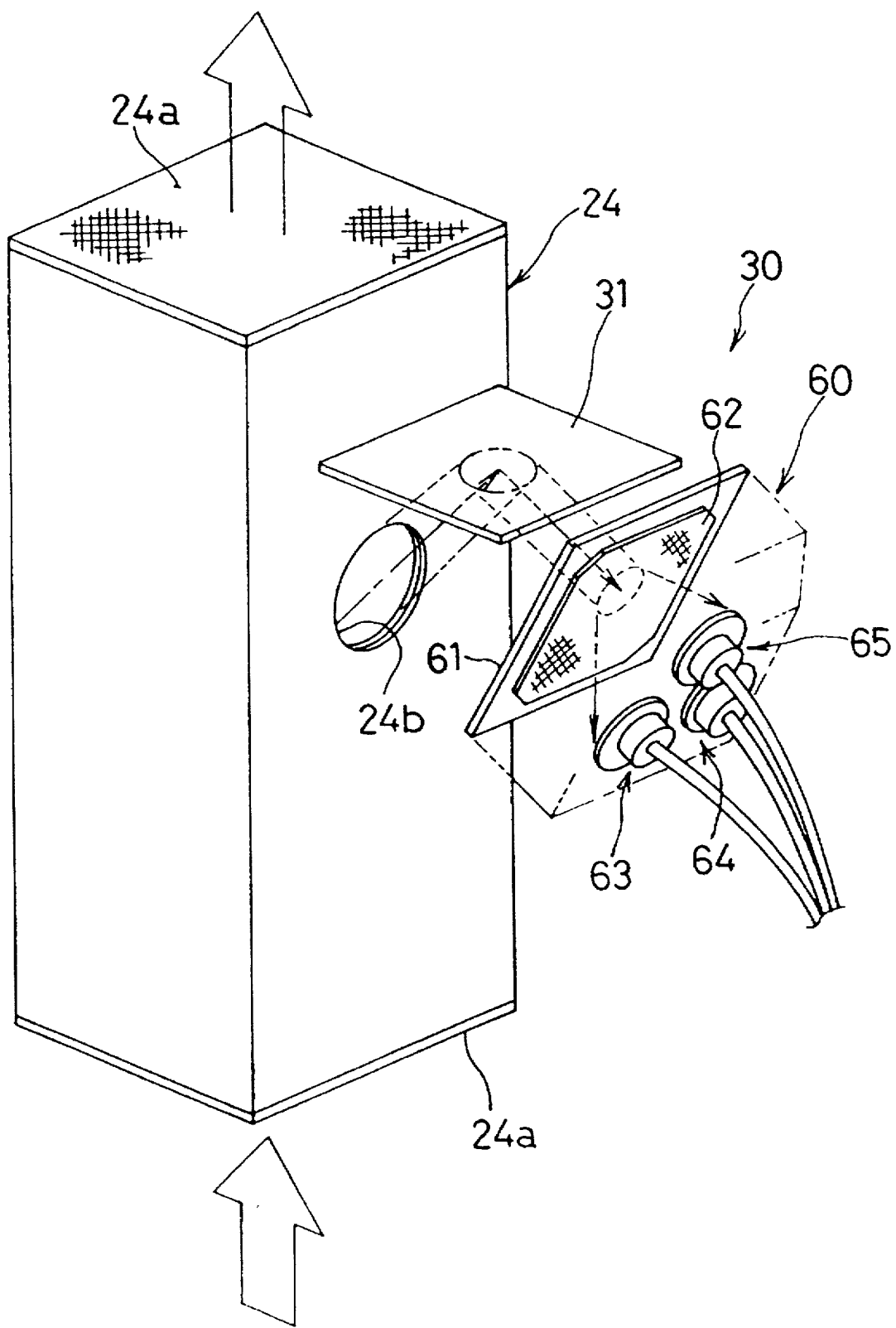
FIG. 3 is a perspective view of a mirror tunnel and a photometric unit constituting the photometric system shown in FIG. 2.

A photometric unit 30 acting as a core element of the photometric system is attached to a side wall of the mirror tunnel 24. As shown in FIG. 2, the mirror tunnel 24 has a tubular overall configuration defined by side walls 24d having inner mirror surfaces 24c. Light diffuser plates 24a are attached to upper and lower ends of the mirror tunnel 24, respectively. As shown in FIGS. 2 and 3, one of the side walls 24d presenting the mirror surfaces 24c defines a circular opening 24b for taking out part of the light traveling through the mirror tunnel 24 for photometric purposes.

The photometric unit 30 includes a reflection mirror 31 attached in horizontal posture to an edge of the opening 24b downstream with respect to the direction of light projection, and a photometer 60 having a light receiving surface directed obliquely upward for metering light emerging from the opening 24b and reflected by the reflection mirror 31. The reflection mirror 31 and photometer 60 are enclosed in a light-shielding housing 32.

Figure 4A:
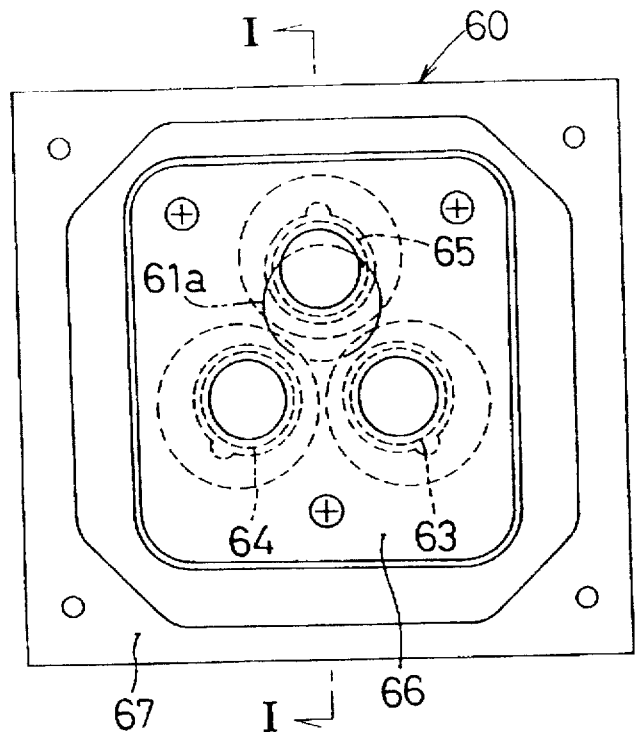
FIG. 4a is a plan view of a photometer of the photometric unit shown in FIG. 3.
Figure 4B:
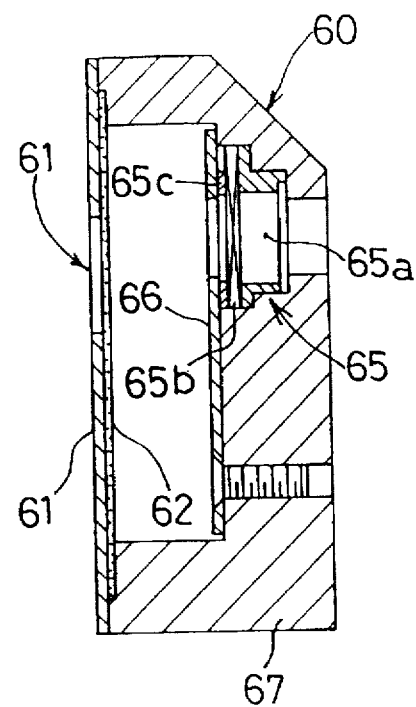
FIG. 4b is a sectional view of the photometer of the photometric unit shown in FIG. 3.

FIG. 3 schematically shows the entire photometric system. FIG. 4a shows the photometer 60, particularly the light receiving surface thereof. FIG. 4b shows a section taken on line A—A of FIG. 4a. As seen from these figures, a base 67 supports a first optical path regulating plate 61, a light diffuser plate 62, a first detecting device 63 for detecting red light, a second detecting device 64 for detecting green light, a third detecting device 65 for detecting blue light, and a second optical path regulating plate 66 defining three bores for regulating light receiving areas of the detecting devices 63, 64 and 65 to be a fixed size. The first optical path regulating plate 61 and light diffuser plate 62 are omitted from FIG. 4a to facilitate view.

The detecting devices 63, 64 and 65 have substantially the same construction. Therefore, only the third detecting device 65 for detecting blue light will be described herein.

The third detecting device 65 for detecting blue light includes a light receiving element 65a, a color filter 65b for selectively passing light in the blue spectral region, and a spacer 65c. Naturally, each of the first detecting device 63 for detecting red light and the second detecting device 64 for detecting green light has a filter for selectively passing light in the red or green spectral region. The third detecting device 65 for detecting blue light is disposed closer than the other detecting devices 63 and 64 to the center of a circular opening 61a in the first optical path regulating plate 61. The third detecting device 65 is disposed closest to the optical axis of light shown in a dot-and-dash line in FIG. 2 which mainly contributes to photometry. Thus, of the three detecting devices 63, 64 and 65, the third detecting device 65 for detecting blue light is disposed in a location for receiving light of the greatest intensity. The first and second detecting devices 63 and 64 are arranged sideways and laterally of the third detecting device 65.

The first to third detecting devices 63, 64 and 65 detect light traveling from the light source 21 to the opening 24b of the mirror tunnel 24, with the light source control filter 23 positioned on the light projecting path. The detecting devices 63, 64 and 65 transmit detection signals to the controller 50.

The controller 50 stores standard detection values of the respective detecting devices 63, 64 and 65. The controller 50 derives correction values from differences between the standard detection values and actual detection values. These correction values are reflected in routines for computing a position to which the adjustment filter 22 is inserted and timing of operating the shutter 26. Consequently, proper light irradiates the film 2 regardless of qualitative variations of the light source 21.

Other embodiments will be listed hereinafter.

Figure 5:
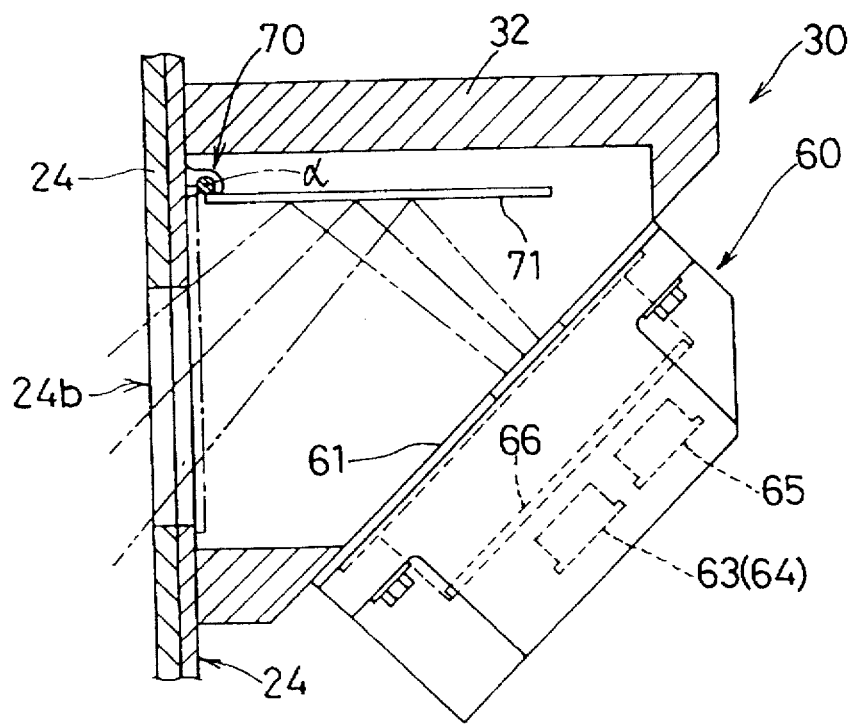
FIG. 5 is a view, partly in section, of the photometric unit shown in FIG. 3.
Figure 6:
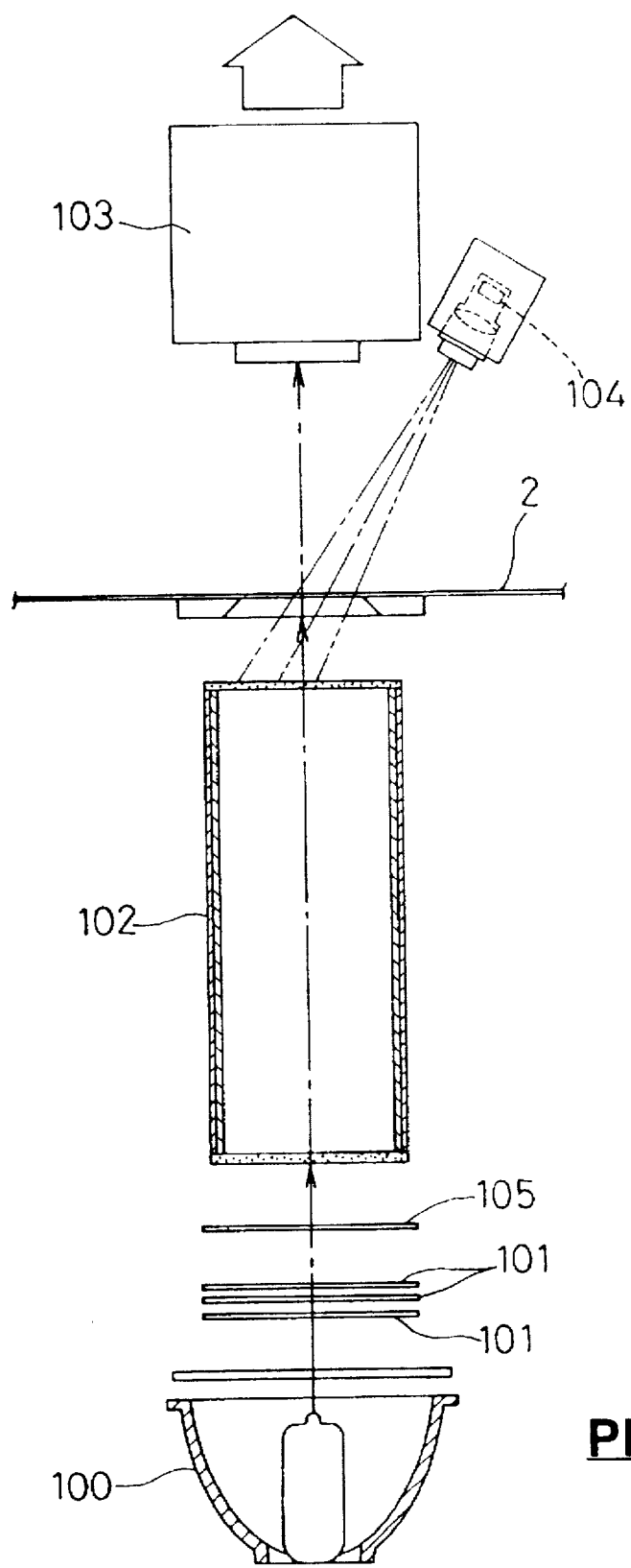
FIG. 6 is an explanatory view of the prior art.

(1) With the fixed reflection mirror 31 in the above embodiment, part of the exposing light is taken out through the opening 24b formed in the side wall 24d of the mirror tunnel 24 also during normal exposure of the printing paper 3. Instead of this construction, as shown in FIG. 5, a reflection mirror 71 may be attached above the opening 24b through a swing mechanism 70 having a pivotal axis a. The reflection mirror 71 is switchable between a first, horizontal position, shown in a solid line in FIG. 5, for reflecting light emerging from the opening 24b toward the photometer 60, and a second, vertical position, shown in a dot-and-dash line in FIG. 5, for closing the opening 24b, with the reflecting surface facing inwardly of the mirror tunnel 24. The reflection mirror 71 is swung under control of the controller 50. When the photometer 60 meters light with the light source control filter 23 positioned on the light projecting path, the reflection mirror 71 is swung to the first position for allowing the light to travel from the opening 24b to the photometer 60. In time of normal exposure of the printing paper 3, the reflection mirror 71 is swung to the second position for preventing the light traveling through the mirror tunnel 24 from exiting through the opening 24b. A rotary solenoid, electric motor or the like may be used for driving the reflection mirror 71. It is of course possible to swing the reflection mirror 71 manually.

(2) In the foregoing embodiment, the photometer 60 meters light with the light source control filter 23 positioned on the light projecting path. The embodiment may be modified to carry out photometry without the light source control filter 23. The light source control filter 23 movable to and from the light projecting path may be replaced by a filter comparable thereto in light transmission characteristics and disposed on the light receiving surface of the photometer 60.

(3) In the foregoing embodiment, the photometer 60 is attached to the mirror tunnel 24. Instead, the photometer 60 may be arranged independently of and spaced from the mirror tunnel 24. In this case, the photometer 60 may be placed in a location little affected by the heat of the mirror tunnel 24 which becomes relatively hot. A geometric optical path using mirrors and the like, or an optical medium such as an optical fiber, may be formed between the opening 24b and the photometer 60.

(4) The photometric system according to this invention, basically, is formed of the light source 21, mirror tunnel 24 and photometer 60. As in the foregoing embodiment, the photometric system is often employed in the projecting and exposing device 20, but may be employed in the image information reader 10. In this case, an opening is formed in the mirror tunnel 12 to take out light to be metered for adjusting the light from the light source 11.

What is claimed is:

1. A photometric system or metering light traveling from a light source through a mirror tunnel to a projection surface, comprising:

a side wall having a mirror surface for forming said mirror tunnel, said side wall defining an opening;

a photometer disposed outside said mirror tunnel for metering only light entering through said opening from a region of said opening and a region displaced from said region of said opening toward said light source; and deflecting means for deflecting toward said photometer the light traveling past said mirror tunnel through said opening.

2. A photometric system as defined in claim 1, wherein said photometer is supported by said mirror tunnel.

3. A photometric system as defined in claim 1, wherein said deflecting means is a reflection mirror.

4. A photometric system as defined in claim 3, wherein said reflection mirror is switchable between a first position for deflecting the light entering through said opening toward said photometer, and a second position for covering said opening.

5. A photometric system as defined in claim 1, wherein said photometer includes a first detecting device for detecting red light, a second detecting device for detecting green light, and a third detecting device for detecting blue light, said third detecting device being disposed in a location for receiving light of maximum intensity entering said photometer, said first detecting device and said second detecting device being arranged around and in substantially the same plane as said third detecting device.

6. A photometric system or metering light traveling from a light source through a mirror tunnel to a projection surface, comprising:

a side wall having a mirror surface for forming said mirror tunnel, said side wall defining an opening;

a photometer disposed outside said mirror tunnel for metering only light entering through said opening from a region of said opening and a region displaced from said region of said opening toward said light source;

wherein said photometer includes a first detecting device for detecting red light, a second detecting device for detecting green light, and a third detecting device for detecting blue light, said third detecting device being disposed in a location for receiving light of maximum intensity entering said photometer, said first detecting device and said second detecting device being arranged around and in substantially the same plane as said third detecting device; and wherein said photometer further includes a light diffuser plate for diffusing the light entering through said opening.

7. A photographic printing apparatus having an exposure device for projecting light traveling from a light source through a mirror tunnel, along a projection path through a photographic film to a photosensitive material, said apparatus comprising:

a side wall having a mirror surface for forming said mirror tunnel, said side wall defining an opening;

a photometer disposed outside said mirror tunnel for metering only light entering through a region of said opening and a region displaced from said region of said opening toward said light source;

a reflection mirror for deflecting the light entering through said opening toward said photometer, said reflection mirror being switchable between a first position for deflecting the light entering through said opening toward said photometer, and a second position for covering said opening; and a controller for controlling a printing process and adjusting printing conditions in response to detection signals received from said photometer.

8. A photographic printing apparatus as defined in claim 7, wherein said reflection mirror is switchable between said first position and said second position by said controller.

9. A photographic printing apparatus as defined in claim 7, further comprising a light source control filter disposed between said light source and said mirror tunnel for adjusting light passing through said mirror tunnel, to light corresponding to light having passed through said photographic film;

wherein said light source control filter is switchable between an operative position on said projection path, and an inoperative position retracted from said projection path, said reflection mirror being switched to said first position when said light source control filter is in said operative position, and to said second position when said light source control filter is in said inoperative position.

* * * * *